Sept. 10, 1968       J. B. MULLIN       3,401,023
CRYSTAL MELT-GROWTH PROCESS WHEREIN THE MELT
SURFACE IS COVERED WITH AN INERT LIQUID
Filed July 27, 1965

United States Patent Office 3,401,023
Patented Sept. 10, 1968

3,401,023
CRYSTAL MELT-GROWTH PROCESS WHEREIN THE MELT SURFACE IS COVERED WITH AN INERT LIQUID
John Brian Mullin, Malvern, England, assignor to National Research Development Corporation, London, England
Filed July 27, 1965, Ser. No. 475,063
Claims priority, application Great Britain, July 29, 1964, 30,055/64
5 Claims. (Cl. 23—301)

ABSTRACT OF THE DISCLOSURE

Crystalline material is placed in a crucible within a closed housing and heat is applied from an external source to cause the crystalline material to become molten. Over the molten crystalline material there is disposed a less dense inert liquid selected from boric oxide, barium oxide and alternately these oxides in admixture with barium chloride and sodium fluoride or mixtures thereof. An inert gas is introduced into the housing to provide a pressure in excess of the vapor pressure of the moist volatile component or impurity of the material to be crystallized. Thereafter the molten crystalline material is cooled while covered with the inert less dense liquid. The crystalline materials suitable for use with the present process are those having the formula $A_{III}B_V$, where $A_{III}$ is an element selected from Group III of the Periodic Table and $B_V$ is an element selected from Group V of the Periodic Table.

---

Figure 1:
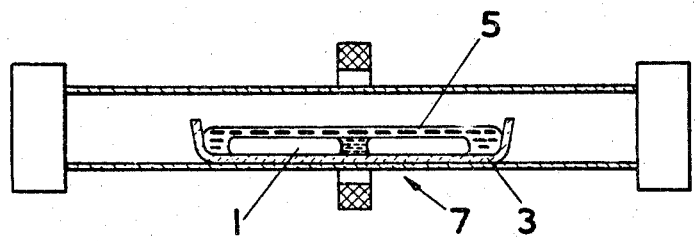

The present invention relates to crystalline material.

Considerable difficulty is commonly experienced in the production and purification of crystalline material containing volatile so called impurities, and crystalline material having one or more volatile components and which may or may not contain volatile impurities, for example, semiconducting materials.

A favoured method for the preparation of homogeneous crystalline material in bulk form is the so-called melt-growth method in which material is crystallised in a controlled manner from the liquid state. There are a number of well-known techniques for carrying out this crystallisation process. In the zone melting process, a liquid zone is formed in an ingot or bar of the material and recrystallisation is achieved by causing the zone to move along the ingot. Impurities can be distributed homogeneously or in some regular manner by this process. Zone refining is a zone melting process in which the zone or zones are moved repeatedly and unidirectionally through the bar of material with the intention of concentrating the foreign elements or impurities towards the ends of the bar. In the vertical pulling process a single crystal is pulled from a melt of the material by dipping a small single crystal seed into the liquid and slowly rotating and withdrawing it.

These melt-growth processes can generally be made to work with pure or nearly pure non-volatile materials, but if one or more components of the material is volatile, or the material contains volatile impurities then considerable technical difficulty and much ingenuity is required in avoiding volatilisation effects and unwanted composition changes in the solid.

For example, in the specification of United Kingdom Patent No. 853,975, it is pointed out that the efficiency of the purification of indium antimonide can be limited by the capricious evaporation of volatile impurities such as zinc and cadmium during zone refining. In the patent specification a process was described in which very pure indium antimonide was prepared by firstly using a controlled evaporation of the volatile impurities to a localised cooled surface where they were permanently condensed in a layer of antimony, and then secondly and subsequently by zone refining the indium antimonide to remove the non-volatile impurities.

The present invention provides an alternative simpler process for purifying elements or compounds containing volatile impurities, whether or not the element or components of the compound are volatile.

The preparation and purification of volatile elements or materials containing volatile components also presents considerable technical difficulties whether they contain volatile impurities or not. The so-called III-V compounds, particularly the arsenides and phosphides are examples of this class of material. Indium arsenside and gallium arsenide are specific examples and we note that the equilibrium vapour pressure of arsenic over stoichiometric melts of these compounds are respectively of the order 0.3 and 1.0 atmosphere pressure. Consequently, on melting such material in a crucible held in a containing vessel. Arsensic will very rapidly distil as a vapour to any cold spot in the containing vessel and condense there. In order to avoid this distillation and condensation it is necessary to arrange that the walls of the containing vessel are at a sufficiently elevated temperature for the arsenic not to condense. The temperature of the containing vessel needs to be in the region of 575° C.–600° C. for the III–V compound arsenides and in the region of 600° C.–700° C. for the phosphides in order to avoid the condensation of arsenic and phosphorus respectively. The need for such high minimum temperatures in containing vessels leads to considerable technical difficulties in the growth of all materials having volatile components whether they contain volatile impurities or not.

Nevertheless techniques have been developed for growing materials having volatile constituents by employing this principle. The horizontal technique requires a special furnace design so that the site of the minimum temperature of the vessel enclosing the material—which is usually located near a reservoir of the volatile component—is closely controlled and generally independently contolled from the main furnace melting the zone. In the vertical pulling process even more complications arise due to the need to move the crystal relative to the melt. This can be achieved by means of an intricate magnetically coupled pulling arrangement or alternatively with a so-called syringe puller employing a high temperature gland to allow rotation and withdrawal motions whilst restricting the volatilisation to a minimum. These processes are currently the standard techniques for preparing indium arsenside and gallium arsenside, and the apparatuses are naturally more complicated and difficult to bring into operation than the conventional zone refining and vertical pulling apparatuses which are conventionally used for preparing nonvolatile materials such as germanium.

However, the present invention enables the use of conventional apparatus without the complications inherent in a design in which the containing vessel is maintained at an elevated temperature for the growth of materials containing volatile components whether they contain volatile impurities or not.

In the present specification and claims the words "at least partly volatile materials" will be used to denote volatile elements or materials containing volatile constituents or impurities, and processes for the preparation of material will include processes for the purification or crystallisation of such material.

It has previously been proposed to pull crystals of the volatile materials lead selenide and lead telluride from the melt under boric oxide. The present invention provides a method of carrying out various melt-growth processes for a variety of crystalline materials containing volatile impurities and/or components.

The procedure which achieves this purpose is carried out by encapsulating the material in the liquid state, liquid 1 by a less-dense inert liquid, liquid 2 and constraining the volatile components or impurities in the material of the first liquid by a physical pressure exerted by an inert gas whose pressure is slightly in excess of the equilibrium vapour pressure over the melt of the material of the most volatile component or impurity in the system.

According to the present invention there is provided a melt-growth process for the preparation of at least partly volatile crystalline material wherein a liquid to solid transition in said material occurs whilst the liquid of said material is encapsulated by an inert liquid which is less dense than said liquid of said material and an inert gas pressure is exerted on said inert liquid which is in excess of the vapour pressure of the most volatile constituent of said material.

The above process is conveniently called the liquid encapsulation process.

Examples of processes embodying the invention will now be described by way of example, with reference to the accompanying drawings, in which—

Figure 2:
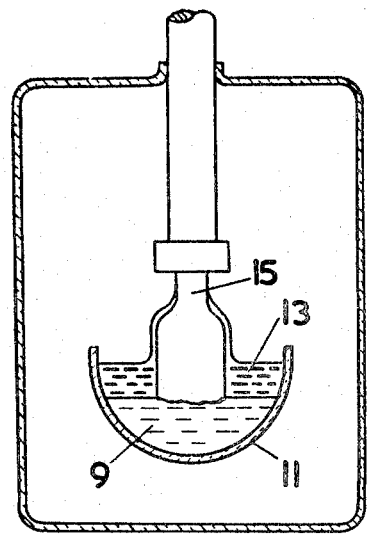

FIGURE 1 is a cross-sectional diagram of a zone-refining apparatus being used to perform a process which embodies the invention, and FIGURE 2 is a cross-sectional diagram of a vertical crystal pulling apparatus being used to perform a process which embodies the invention.

Indium arsenide and gallium arsenide are III–V compounds having a volatile component arsenic. Indium arsenide and gallium arsenide cannot be prepared, therefore, using conventional germanium type horizontal and vertical pulling crystal growing apparatus unless some special procedure is adopted. In fact pure indium arsenide and gallium arsenide are generally prepared from ultra pure indium and arsenic (99.9999% purity) using a specially designed furnace. The material is not generally subsequently zone refined. Any volatile impurities would be uniformly distributed in the ingot if it were so zone refined.

FIGURE 1 is a cross-sectional diagram of a zone-refining apparatus for the purification of indium arsenide. In the recommended procedure for indium arsenide, indium and arsenic (it is not necessery to use the purest and most expensive materials) are preformed into an ingot 1 using standard techniques. Close control is not vital. The ingot is then placed in a vitreous carbon or silica boat 3 and pieces of boric oxide which have previously been vacuum baked at about 1,000° C. in a platinum boat are distributed on top of the ingot 1. In an alternative procedure barium chloride (vacuum baked at about 1,000° C.) may be substituted for boric oxide. The boat 3 should be sufficiently tall sided to allow the indium arsenide to be covered to a depth of about a centimetre with boric oxide when the latter is molten, 5. The boric oxide 5 acts as a gettering agent for metallic impurities and is additionally useful in preventing spurious nucleation due to oxide formation. The boat 3 is then placed in a conventional germanium-type zone refining apparatus 7. The system is flushed with an inert gas (nitrogen or argon) and then the pressure of the gas is adjusted to be greater than 0.3 atmosphere and generally 1 atmosphere. If fairly volatile impurities are known to be present the pressure should be adjusted so that it is greater than the vapour pressure of the most volatile impurity over the liquid indium arsenide. The ingot 1 is then zone refined in a manner similar to that used for germanium. It is an advantage to use a single crystal seed of indium arsenide in order that the indium arsenide may be zone refined as a single crystal.

In the growth of horizontal crystals generally it may be useful to coat the boat 3 with boric oxide. The liquid film formed when it is molten may be useful in gettering metallic oxides, preventing spurious nucleation and reducing or eliminating attack between the material being zone melted and the material of the boat 3.

Gallium arsenide can be zone refined in a similar manner, but the boric oxide 5 is gradually lost by evaporation and may need to be replenished. A mixture of barium oxide and boric oxide—50 percent molecular proportions of each—will substantially reduce the loss of boric oxide. A silica boat is not then recommended and a vitreous carbon boat is desirable. The vapour pressure of the inert gas should not be less than 1.1 atmospheres.

In another example single crystals of indium arsenide or gallium arsenide can be pulled in a conventional germanium-type vertical crystal pulling apparatus such as is illustrated in FIGURE 2. A quantity of indium arsenide or gallium arsenide 9 with or without a doping impurity is placed in a vitreous carbon or silica crucible 11. Sufficient vacuum baked boric oxide is added to ensure the molten charge will be covered to a depth of about a centimetre with liquid boric oxide 13. The system is flushed with inert gas and the pressure of the gas is adjusted to the known vapour pressure of the volatile impurity over the melt of indium arsenide or gallium arsenide or a vapour pressure of 1.1 atmospheres whichever pressure is larger. Then a crystal is pulled in the usual manner by pushing a single crystal seed 14 through the liquid boric oxide or barium chloride or boric oxide/barium oxide mixture, seeding on the liquid indium arsenide or gallium arsenide, and then withdrawing and pulling in the usual manner. It is essential to use a sufficient depth of encapsulating liquid for arsenic not to evaporate from the surface of the crystal. In practice, where boric oxide is the encapsulating liquid, it may form a skin over the surface of the crystal which can prevent the evaporation of arsenic therefrom; in other cases a sufficient depth of encapsulating liquid must be employed for the temperature of the emerging crystal to be sufficiently low for the asenic not to evaporate.

It may be convenient to provide an additive to the encapsulating liquid. For example, 5% (by weight) sodium fluoride may be added to boric oxide to lower its viscosity.

I claim:

1. A process for producing at least partially volatile crystalline material by a melt growth process including placing in a crucible within a closed housing a charge of said material having the formula $A_{III}B_V$ where $A_{III}$ is an element selected from Group III of the Periodic Table and $B_V$ is an element selected from Group V of the Periodic Table and mixture thereof, applying heat from an external source to at least a portion of the material to cause a solid to liquid transition zone to be generated therein and provide a body of melt, covering the melt at its surface with a less dense inert liquid selected from the group consisting of boric oxide, barium oxide and barium chloride and mixtures thereof, boric oxide and barium oxide and mixtures thereof further in admixture with sodium fluoride, introducing an inert gas into the said housing such that the pressure of said inert gas exerted on said inert liquid is in excess of the vapor pressure of the most volatile constituent of said material to be crystallized, thereafter cooling said melt progressively to crystallize the material while the crystallized material is covered with said inert, less dense liquid.

2. The process of claim 1 wherein $A_{III}$ is selected from the group consisting of indium and gallium and $B_V$ is selected from the group consisting of arsenic and phosphorus.

3. The process of claim 1 wherein $A_{III}B_V$ is selected from the group consisting of indium and gallium arsenides and phosphides and mixtures thereof.

4. The process of claim 1 wherein $A_{III}B_V$ is selected from the group consisting of indium arsenide and gallium arsenide.

5. The process of claim 4 wherein the said less dense inert liquid is selected from the group consisting of boric oxide, barium oxide and mixtures thereof, barium chloride/barium oxide mixtures and sodium fluoride/boric oxide mixtures.

References Cited

UNITED STATES PATENTS

| 2,766,110 | 10/1956 | Meister | 23—273 |
| 3,058,854 | 10/1962 | Angello | 23—301 |
| 3,198,606 | 8/1965 | Lyons | 23—273 |
| 3,245,761 | 4/1966 | Scott | 23—273 |

FOREIGN PATENTS 1,002,741  2/1957  Germany.

NORMAN YUDKOFF, *Primary Examiner.*

G. P. HINES, *Assistant Examiner.*